US008675120B2

(12) United States Patent
Takahashi (10) Patent No.: US 8,675,120 B2
(45) Date of Patent: Mar. 18, 2014

(54) MANUAL FOCUSING MECHANISM OF IMAGING APPARATUS AND IMAGING APPARATUS

(75) Inventor: Kazunori Takahashi, Tokyo (JP)

(73) Assignee: Ricoh Imaging Company, Ltd., Tokyo (JP)

( * ) Notice: Subject to any disclaimer, the term of this patent is extended or adjusted under 35 U.S.C. 154(b) by 63 days.

(21) Appl. No.: 12/826,068

(22) Filed: Jun. 29, 2010

(65) Prior Publication Data

US 2011/0001867 A1     Jan. 6, 2011

(30) Foreign Application Priority Data

Jul. 2, 2009  (JP) .................................. 2009-157908

(51) Int. Cl.
*H04N 5/232* (2006.01)
*H04N 5/225* (2006.01)

(52) U.S. Cl.
USPC .......................................... 348/345; 348/373

(58) Field of Classification Search
USPC .................... 348/345, 360; 350/430
See application file for complete search history.

(56) References Cited

U.S. PATENT DOCUMENTS

| 4,506,959 A * | 3/1985 | Hama ............................ 359/706 |
| 2005/0068444 A1* | 3/2005 | Oshima et al. ................ 348/335 |
| 2009/0167924 A1* | 7/2009 | Raschke et al. .............. 348/345 |

FOREIGN PATENT DOCUMENTS

| JP | 4-130917 | 12/1992 |
| JP | 11-149106 A | 6/1999 |
| JP | 11-202383 A | 7/1999 |
| JP | 2005-62385 | 3/2005 |
| JP | 2007-93656 A | 4/2007 |

OTHER PUBLICATIONS

Japan Office action, dated May 7, 2013 along with an english translation thereof.

* cited by examiner

*Primary Examiner* — Joel Fosselman
(74) *Attorney, Agent, or Firm* — Greenblum & Bernstein, P.L.C.

(57) ABSTRACT

A manual focusing mechanism, of an imaging apparatus provided with a lens system that includes a focusing lens group, which changes an image plane position by linearly moving the focusing lens group in an optical axis direction thereof via a manual operation of a focusing operational member includes a click-stop mechanism which holds the focusing operational member at one of a plurality of click-stop positions with respect to a support member. An amount of movement of the image plane position in the optical axis direction per one click-stop position of the focusing operational member via the click-stop mechanism is determined to be within a range of the depth of focus of the lens system of the imaging apparatus. An imaging apparatus having such a manual focusing mechanism is also disclosed.

9 Claims, 5 Drawing Sheets

MANUAL FOCUSING MECHANISM OF IMAGING APPARATUS AND IMAGING APPARATUS

BACKGROUND OF THE INVENTION

1. Field of the Invention

The present invention relates to a manual focusing mechanism of an imaging apparatus, and also relates to the imaging apparatus itself.

2. Description of Related Art

In a manual focusing mechanism of an imaging apparatus (e.g., a camera), it is normal to attain an in-focus state by moving a focusing lens group along the optical axis direction thereof in a stepless manner via a manual rotational operation of a focusing ring. However, Japanese Unexamined Patent Publication No. 2005-62385 teaches a focusing mechanism for highly specialized purposes in which a focusing lens group is moved stepwise along the optical axis direction thereof.

Manual focusing is usually carried out by rotating a manual focusing ring while visually confirming the actual focus state; however, it is very difficult to discern the extent by which the manual focusing ring should be rotated under conditions where the focus state cannot be visually confirmed in real-time. For example, in recent years, many surveillance cameras have been using transparent covers to cover the exterior of the camera. In such cameras, in which the focal length of the camera lens thereof is adjusted and then set (fixed) at the adjusted focal length, sometimes the focal length deviates from the in-focus position (state) due to the transparent cover being subsequently mounted and changing the optical conditions. It has proven difficult, requiring expert skill, to adjust the focal length of the camera lens in order to offset such focal-length deviation before mounting the transparent cover with such a conventional manual focusing mechanism.

SUMMARY OF THE INVENTION

The present invention has been devised in view of the above-described problem, and provides an imaging apparatus and a manual focusing mechanism therefor in which an in-focus state can be easily attained compared to a convention mechanism even under conditions where the visual confirmation of the focal state is restricted.

According to an aspect of the present invention, a manual focusing mechanism, of an imaging apparatus provided with a lens system that includes a focusing lens group, is provided, which changes an image plane position by linearly moving the focusing lens group in an optical axis direction thereof via a manual operation of a focusing operational member, the manual focusing mechanism including a click-stop mechanism which holds the focusing operational member at one of a plurality of click-stop positions with respect to a support member, which supports the focusing operational member. An amount of movement of the image plane position in the optical axis direction per one click-stop position of the focusing operational member via the click-stop mechanism is determined to be within a range of the depth of focus of the lens system of the imaging apparatus.

It is desirable for the click-stop mechanism to include a toothed section provided on one of the focusing operational member and the support member, the toothed section provided with a plurality of click-stop recesses and a plurality of click-stop projections that are alternately arranged at different positions in an operational direction of the focusing operational member; and a stopper member provided on the other of the focusing operational member and the support member, the stopper member being movable in an engaging/disengaging direction toward/from the toothed section, wherein the stopper member applies a movement resistance against the focusing operational member by engagement of the stopper member with any one of the plurality of click-stop recesses of the toothed section.

It is desirable for the stopper member to include a spherical ball.

It is desirable for the click-stop mechanism to include a biaser for biasing the stopper member in the engaging direction toward the toothed section so that the stopper member engages with any one of the plurality of click-stop recesses of the toothed section.

It is desirable for the focusing operational member and the support member to include a pair of ring members that are coaxially arranged about the optical axis of the lens system, wherein inner and outer peripheral surfaces of the pair of ring members mutually face each other. The biaser includes a semi-annular leaf spring which is supported along a peripheral surface of one of the pair of ring members.

It is desirable for the semi-annular leaf spring to be provided along the peripheral surface of the one ring member so as to occupy an angular range of 190 degrees through 220 degrees in a circumferential direction of the one ring member.

It is desirable for the focusing operational member to move in the optical axis direction while rotating about the optical axis with respect to the support member via a helicoid formed on the inner and outer peripheral surfaces of the pair of ring members that constitute the focusing operational member and the support member, wherein the focusing lens group moves together with the focusing operational member in the optical axis direction.

In an embodiment, an imaging apparatus is provided, including a photographing lens barrel provided with a photographing lens system and a focusing mechanism; and a transparent cover, which is provided separately from the photographing lens barrel and covers at least an area defined by an angle-of-view of the photographing lens system. The focusing mechanism includes a focusing operational member that is provided with a click-stop mechanism, the click-stop mechanism enabling the focusing operation member to be manually operable while providing a plurality of click-stop positions at which the focusing operation member is held. An amount of movement of an image plane position in the optical axis direction per one of the click-stop positions of the focusing operational member via the click-stop mechanism is determined to be within a range of the depth of focus of the photographing lens system.

According to the imaging apparatus and the manual focusing mechanism of the present invention, since the amount of movement (along the optical axis direction) of the focusing lens group can be discerned via the number of tactile clicks felt during the rotational movement of the focusing ring member, an appropriate amount of rotational movement of the manual focusing ring member for attaining an in-focus state can be easily discerned even under restricted conditions of visual-confirmation of the focal state, and does not require a highly skilled person to carry out such a focusing operation.

The present disclosure relates to subject matter contained in Japanese Patent Application No. 2009-157908 (filed on Jul. 2, 2009) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
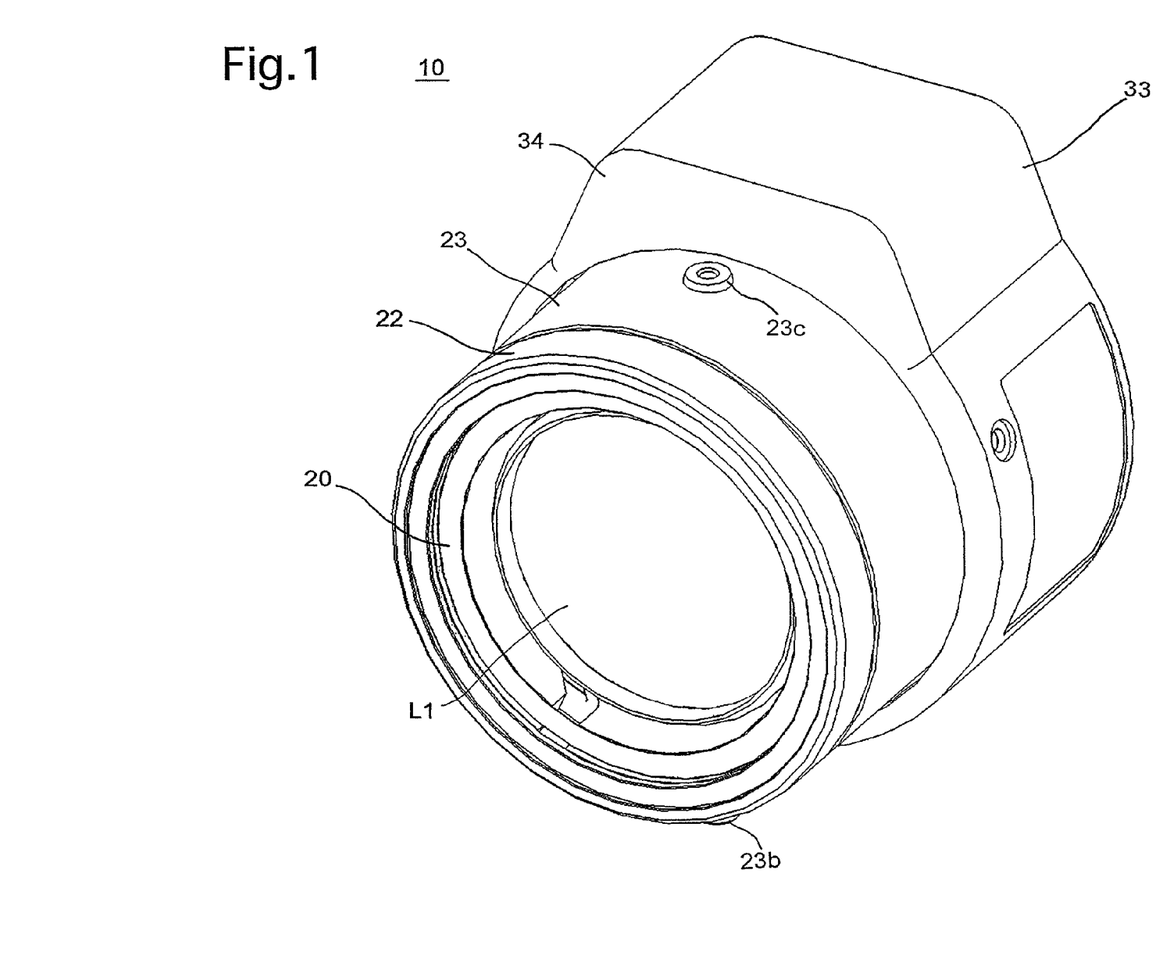
FIG. 1 shows a front perspective view of a zoom lens barrel according to the present invention.
Figure 2:
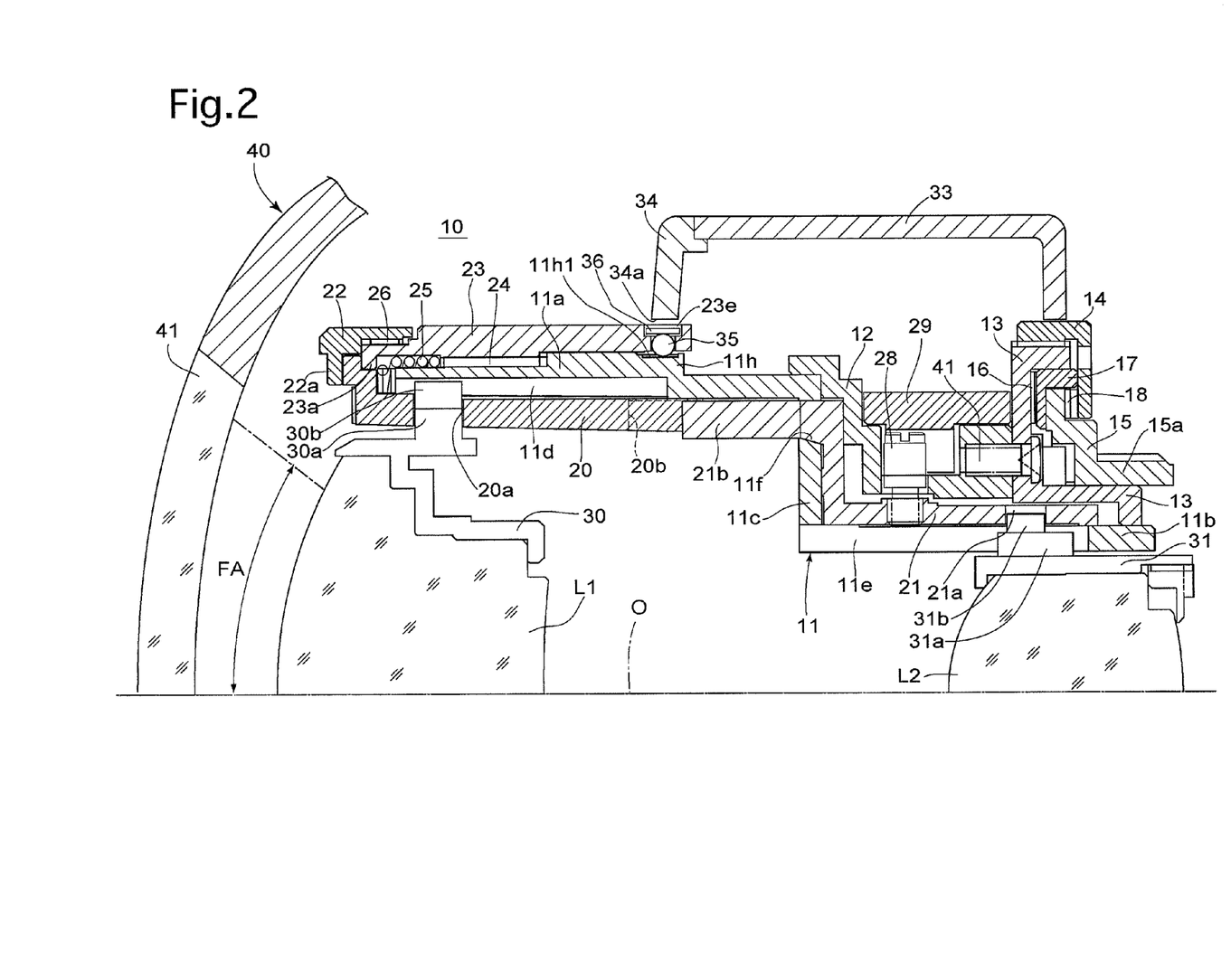
FIG. 2 is a lateral cross-sectional view of an upper half of the zoom lens barrel shown in FIG. 1.
Figure 3:
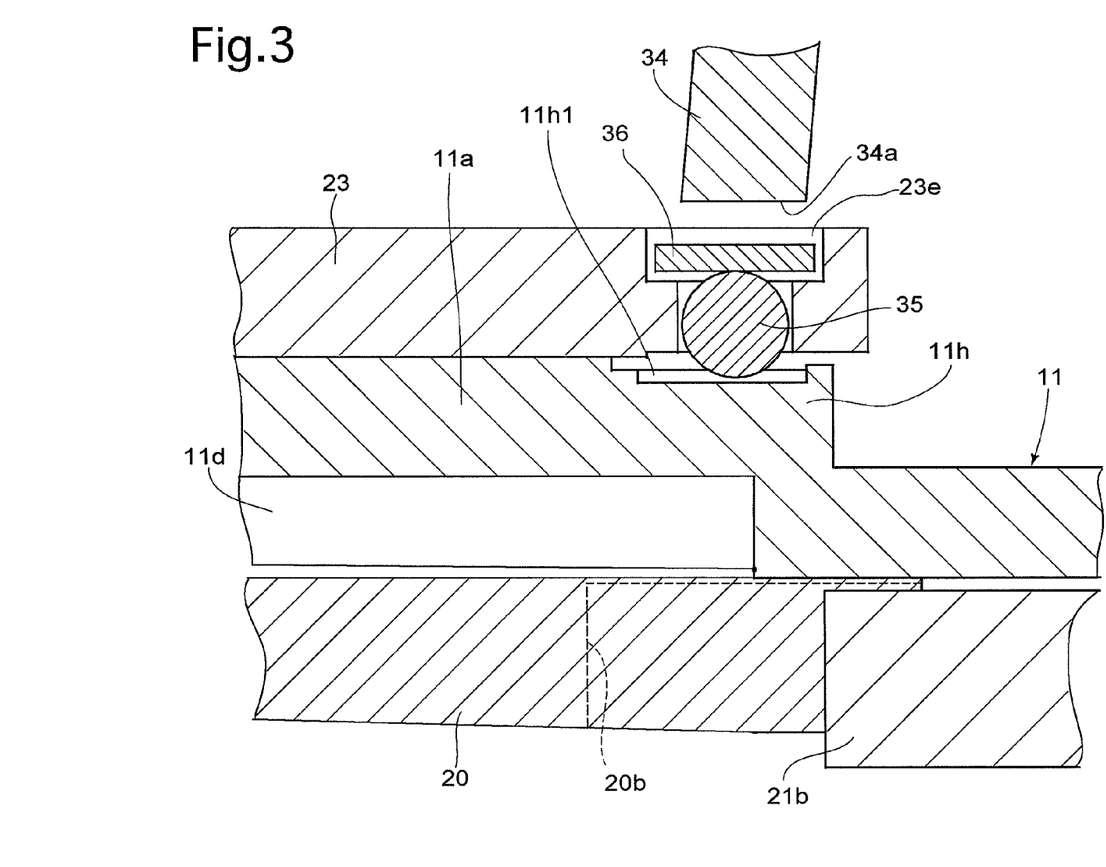
FIG. 3 is an enlarged lateral cross-sectional view of the area surrounding a click-stop mechanism of the zoom lens barrel shown in FIG. 1.

A lens barrel 10 to which the present invention is applied, the overall structure of which is shown in FIGS. 1 and 2, is for use in a CCTV (Closed-Circuit Television) system. The lens barrel 10 is a zoom lens barrel provided with a front lens group (focusing lens group) L1 and a rear lens group L2, which constitute optical components of an imaging optical system (photographing lens system). In the following description, a direction along the optical axis O of such an imaging optical system will be referred as an "optical axis direction", in which a direction toward the object side (leftward in FIG. 2) is referred to as the "front" or a "forward direction" and a direction toward an image plane (rightward in FIG. 2) of the imaging optical system will be referred to as the "rear" or a "rearward direction".

The lens barrel 10 is provided with an annular fixed frame (support member/ring member) 11, the center of which is coincident with the optical axis O. The front portion of the fixed frame 11 is provided as a large-diameter cylindrical portion 11a, and the rear portion of the fixed frame 11 is provided as a small-diameter cylindrical portion 11b that is smaller in diameter than the large-diameter cylindrical portion 11a. The large-diameter cylindrical portion 11a and the small-diameter cylindrical portion 11b are coaxial with each other. An intermediate flange 11c which connects the large-diameter cylindrical portion 11a with the small-diameter cylindrical portion 11b is formed at the boundary between the large-diameter cylindrical portion 11a and the small-diameter cylindrical portion 11b. An intermediate fixed ring 12 is fixed to the intermediate flange 11c of the fixed frame 11. A rear decorative ring 13 is fixed to the intermediate fixed ring 12 via mounting screws 41.

The rear decorative ring 13 is in the form of a double cylindrical shaped member having a common central axis (that coincides with the optical axis O), the outer peripheral surface of an outer cylindrical portion thereof being screw-engaged with a mount stationary-ring 14 via a male and female threads respectively provided thereon. Furthermore, a mount ring 15 is supported on an outer peripheral surface of an inner cylindrical portion of the rear decorative ring 13 to be relatively rotatable thereto. The position of the mount ring 15 in the optical axis direction is determined by an adjusting washer(s) 16, a mount spacer ring 17 and a mount spring 18, and also by being sandwiched in between the rear decorative ring 13 and the mount stationary-ring 14. The lens barrel 10 can be mounted onto a camera body (not shown) by screw-engaging a mount thread (male thread) formed on an outer peripheral surface of a cylindrical portion 15a (of the mount ring 15) that protrudes in a rearward direction with a mount thread (female thread) formed on a mount provided on the camera body. In a state where no external force is applied to the lens barrel 10, the angular position of the mount ring 15 with respect to the rear decorative ring 13 can be maintained constant due to the frictional force obtained by the biasing force of the mount spring 18. Hence, this frictional connection between the rear decorative ring 13 and the mount ring 15 can be momentarily released by applying a predetermined amount of force in the optical axis direction so that the rear decorative ring 13 and the mount ring 15 are able to relatively rotate (perform an angular adjustment) about the optical axis O in this connection-released state; accordingly, the mounting angle of the lens barrel 10 can be adjusted with respect to the camera body.

Figure 4:
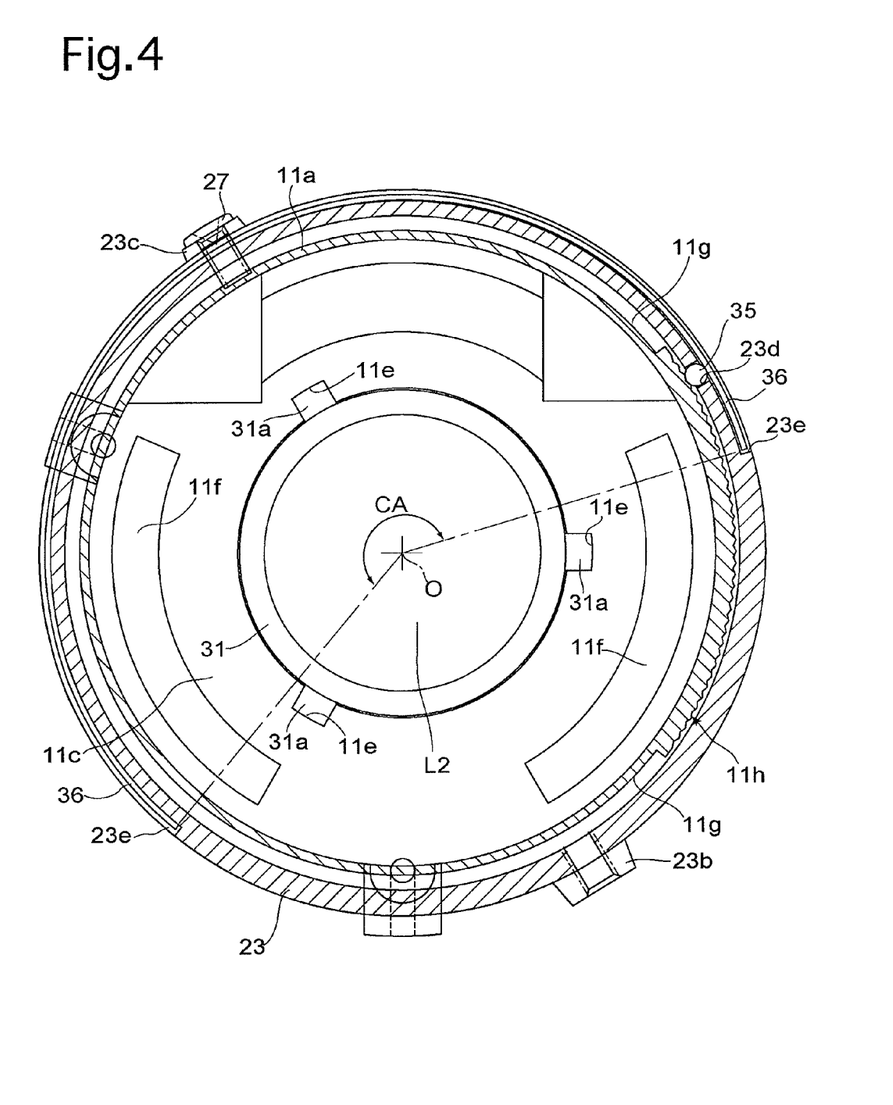
FIG. 4 is a cross-sectional view taken along a plane orthogonal to the optical axis, of the zoom lens barrel shown in FIG. 1, of the area surrounding a click-stop mechanism.

Linear guide grooves 11d are formed in the large-diameter cylindrical portion 11a of the fixed frame 11, and linear guide grooves 11e are formed in the small-diameter cylindrical portion 11b of the fixed frame 11. Each linear guide groove 11d is a bottomed groove that is formed on the inner peripheral surface of the large-diameter cylindrical portion 11a, and each linear guide groove 11e is a through-groove that is formed through (in a radial direction) the small-diameter cylindrical portion 11b. A front cam ring 20 is provided inside the large-diameter cylindrical portion 11a and is rotatably supported thereby, and a rear cam ring 21 is provided on the outside of the small-diameter cylindrical portion 11b and is rotatably supported thereby. Front-lens-group cam through-grooves 20a are formed through the peripheral portion of the front cam ring 20 so that the front-lens-group cam through-grooves 20a intersect with the linear guide grooves 11d, respectively. Rear-lens-group cam grooves 21a are formed on the inner periphery of the rear cam ring 21 so that the rear-lens-group cam grooves 21a intersect with the linear guide grooves 11e, respectively. The rear cam ring 21 is supported (sandwiched) between the intermediate flange 11c of the fixed frame 11 and the intermediate fixed ring 12 to be maintained at a stationary position in the optical axis direction. Furthermore, rotational-transfer keys 21b are provided on the front end of the rear cam ring 21 so as to project in a forward direction therefrom, and these rotational-transfer keys 21b respectively pass through key-insertion through-holes 11f that are formed through the intermediate flange 11c of the fixed frame 11 and each have an arc shape that is centered about the optical axis, and extend into the internal space of the large-diameter cylindrical portion 11a so as to engage with rotational-transfer grooves 20b formed in the front cam ring 20. As shown in FIG. 4, two key-insertion through-holes 11f are provided at different circumferential positions (about the optical axis), and two rotational-transfer grooves 20b and two rear-lens-group cam grooves 21a (only one of each is respectively shown in FIG. 2) are provided to respectively correspond with the two key-insertion through-holes 11f.

A focusing ring (focusing operational member/ring member) 23 is supported on the outer side of the large-diameter cylindrical portion 11a of the fixed frame 11, via a focusing helicoid 24, so as to rotate relative to the large-diameter cylindrical portion 11a in accordance with the focusing helicoid 24. More specifically, the focusing helicoid 24 is configured of a male helicoid formed on the outer peripheral surface of the large-diameter cylindrical portion 11a and a female helicoid formed on the inner peripheral surface of the focusing ring 23. A retainer ring 22 is supported on the outer front end of the focusing ring 23 via a fine thread 26, and a front end portion of the front cam ring 20 is supported (sandwiched) in between an inner flange 22a that is formed on inner periphery of the retainer ring 22 and a front end flange 23a of the focusing ring 23 so as not to relatively move in the optical axis direction. In other words, the front cam ring 20 is made integral with the focusing ring 23 in the optical axis direction via the retainer ring 22. Whereas the front end portion of the front cam ring 20 is rotatable relative to the inner flange 22a of the retainer ring 22 and the front end flange 23a of the focusing ring 23 about the optical axis O. The inner flange 22a of the retainer ring 22, the front end portion of the front cam ring 20, and the front end flange 23a of the focusing ring 23 constitute a relatively-rotatable coupling. A predetermined amount of frictional force acts in a rotational direction on this relatively-rotatable coupling via a friction spring 25.

As shown in FIG. 4, a lever support seat 23b and a screw support seat 23c, each of which have a threaded hole formed therethrough in a radial direction, are provided on the outer periphery of the focusing ring 23 at diametrically opposite positions, i.e., at positions substantially symmetrical with respect to the optical axis O. A base portion of a focus lever (not shown) that radially extends in an outer direction from the focusing ring 23 is screw-engaged into the threaded hole that is formed through the lever support seat 23b to be supported thereby. A control screw 27 is screw-engaged into the threaded hole of the screw support seat 23c to be supported thereby. In a state where the control screw 27 is screwed down so that the head of the control screw 27 abuts against the screw support seat 23c, the threaded shaft portion of the control screw 27 projects internally into the focusing ring 23 in a radial direction, and a circumferential groove (bottomed groove) 11g (see FIG. 4) is formed on the outer periphery of the large-diameter cylindrical portion 11a of the fixed frame 11 so that the bottom end of the control screw 27 (that projects in an inner radial direction) enters into the circumferential groove 11g.

As shown in FIG. 4, a click-stop ring section (toothed section) 11h is formed on the large-diameter cylindrical portion 11a of the fixed frame 11 at a different circumferential location to the circumferential area occupied by the circumferential groove 11g. As shown in the enlarged view of FIG. 5, the click-stop ring section 11h is provided on the outer periphery thereof with a plurality of click-stop recesses 11h1 and a plurality of click-stop projections 11h2 which are alternately arranged in a circumferential direction (operational direction) so as to define a toothed outer surface. A ball-receiving hole 23d is formed in the focusing ring 23 so as to extend therethrough in a radial direction at a position facing the click-stop ring section 11h, and a click ball (stopper member) 35 is provided inside the ball-receiving hole 23d. The click ball 35 is a spherical ball that is supported within the ball-receiving hole 23d to be moveable in a radial direction of the focusing ring 23. The click ball 35 is biased toward the inner radial direction of the focusing ring 23, i.e., so as to contact the click-stop ring section 11h, by a click spring (biaser/semi-annular leaf spring) 36 provided on the outer side of the click ball 35. The click spring 36 is a semi-annular (C-shaped) leaf spring having a large length in the circumferential direction. A spring accommodation groove 23e is formed in the focusing ring 23, on the outer peripheral surface thereof, for accommodating the click spring 36. The length of the click spring 36 in the circumferential direction of the focusing ring 23 is determined so that the click spring 36 occupies an angle CA having a range of 190 degrees through 220 degrees about the optical axis O when viewed in the optical axis direction, as shown in FIG. 4. The click spring 36 is fixed at one end thereof within the spring accommodation groove 23e, and the other end (free end) of the click spring 36 which presses against the click ball 35 is elastically deformable in the radial direction of the focusing ring 23. Hence, the click-stop ring section 11h, the click ball 35 and the click spring 36 constitute a focusing click-stop mechanism, via which the focusing ring 23 is held (click-stopped) intermittently at any one of a plurality of click-stop positions arranged in the rotational direction of the focusing ring 23 with respect to the fixed frame 11. More specifically, the focusing ring 23 can be held at any one of the rotational positions (click-stop positions) at which the click ball 35 is engaged with one of the click-stop recesses 11h1 by the biasing force of the click spring 36, and the focusing ring 23 does not stop at an intermediate angular position at which the click ball 35 rides up onto one of the click-stop projections 11h2. A rotational resistance (movement resistance) is applied against the focusing ring 23 at each click-stop position by the engagement of the click ball 35 with each respective click-stop recess 11h1, and the focusing ring 23 can be rotated while generating a tactile 'click' at each click-stop position by applying an operational force that exceeds a predetermined force against this rotational resistance. Note that the range in which the click-stop ring section 11h can be formed in the optical axis direction is determined so that the click-stop ring section 11h (click-stop recesses 11h1) can remain engaged with the click ball 35 even if the focusing ring 23 moves in optical axis direction relative to the fixed frame 11 via the focusing operation (discussed below).

The rear cam ring 21 is connected with a zoom ring 29 via a link pin 28 so as to integrally rotate with the zoom ring 29. The zoom ring 29 is (manually) rotated about the optical axis O via a zoom lever (not shown).

A front-lens-group support frame 30, which supports a front lens group L1, is provided with cam-follower projections 30a which radially project outward from an outer periphery of the front-lens-group support frame 30, and linear guide projections 30b which project further outwards in the radial direction from the respective cam-follower projections 30a. The cam-follower projections 30a are slidably engaged with the front-lens-group cam through-grooves 20a of the front cam ring 20, respectively, and the linear guide projections 30b are slidably engaged with the linear guide grooves 11d of the fixed frame 11, respectively. In other words, the front-lens-group support frame 30 is linearly guided in the optical axis direction via the engagement between the linear guide projections 30b and the linear guide grooves 11d, and when the front cam ring 20 is rotated the front-lens-group support frame 30 is linearly moved in the optical axis direction via the engagement between the cam-follower projections 30a and the front-lens-group cam through-grooves 20a.

A rear-lens-group support frame 31, which supports a rear lens group L2, is provided with linear guide projections 31a which radially project outward from an outer periphery of the rear-lens-group support frame 31, and cam-follower projections 31b which project further outwards from the linear guide projection 31a in the radial direction. The linear guide projections 31a are slidably engaged with the linear guide grooves 11e of the fixed frame 11, respectively, and the cam-follower projections 31b are slidably engaged with the rear-lens-group cam grooves 21a of the rear cam ring 21, respectively. In other words, the rear-lens-group support frame 31 is linearly guided in the optical axis direction via the engagement between the linear guide projections 31a and the linear guide grooves 11e, and when the rear cam ring 21 is rotated the rear-lens-group support frame 31 is linearly moved in the optical axis direction via the engagement between the cam-follower projections 31b and the rear-lens-group cam grooves 21a.

A section of the lens barrel 10 from the mount stationary-ring 14 to the vicinity of the base-end of the focusing ring 23 is covered by a rear cover 33 and a front cover 34. Although not shown in the drawings, the rear cover 33 is provided with a through-slot (through-groove), through which the aforementioned zoom lever extends to project externally therefrom. The through-slot of the rear cover 33 has a circumferential length that allows for the zoom lever to move within the circumferential movement range thereof (determined by the rotational operation range of the zoom ring 29). Furthermore, as shown in FIG. 2, an annular surrounding member 34a of the front cover 34 is provided so as to surround the outer periphery of spring accommodation groove 23e of the focusing ring 23.

The manual operation of the lens barrel 10 having the above-described structure will be hereinafter discussed. A zooming operation is performed by manually rotating the zoom ring 29 in a circumferential direction via the aforementioned zoom lever. Upon the zoom ring 29 being rotated about the optical axis O, the rotational action thereof is transferred to the rear cam ring 21 via the link pin 28. Upon the rear cam ring 21 rotating about the optical axis O, the rear-lens-group support frame 31, which is linearly guided in the optical axis direction via the linear guide grooves 11e and the linear guide projections 31a, is moved in the optical axis in accordance with a predetermined (zoom) path due to the cam-follower projections 31b being guided by the rear-lens-group cam grooves 21a. Furthermore, the rotation of the rear cam ring 21 is transferred to the front cam ring 20 via the engagement between the rotational-transfer keys 21b and the rotational-transfer grooves 20b, which also causes the front cam ring 20 to rotate about the optical axis O. Subsequently, the front-lens-group support frame 30 which is linearly guided in the optical axis direction via the linear guide grooves 11d and the linear guide projections 30b is moved in the optical axis direction in accordance with a predetermined zoom path via the cam-follower projections 30a being guided by the front-lens-group cam through-grooves 20a, respectively. During this zooming operation, the front end portion of the front cam ring 20 rotates relative to both the inner flange 22a (that faces the front end of the front cam ring 20 in the optical axis direction) of the retainer ring 22 and the front end flange 23a of the focusing ring 23, and the retainer ring 22 and the focusing ring 23 do not rotate. Therefore, no movement of the focusing ring 23 via the focusing helicoid 24 is performed in the optical axis direction, and hence, the front cam ring 20 rotates about the optical axis at a fixed position without changing the position thereof (without moving) in the optical axis direction. In other words, during a zooming operation, the front cam ring 20 and the rear cam ring 21 integrally rotate with each other about the optical axis without relatively moving in the optical axis direction so as to, in effect, function as a single cam ring member.

A focusing operation is performed by manually rotating the focusing ring 23 via the aforementioned focus lever (not shown). Upon the focusing ring 23 being rotated about the optical axis O, the focusing ring 23 moves in the optical axis direction with respect to the fixed frame 11 via the screw-engagement between the focusing ring 23 and the focusing helicoid 24 (i.e., via the male helicoid on the outer periphery of the large-diameter cylindrical portion 11a and the female helicoid on the inner periphery of the focusing ring 23). The retainer ring 22, which is connected to the focusing ring 23 via the fine thread 26, also rotates integrally with the focusing ring 23 while moving in the optical axis direction. Accordingly, the front cam ring 20, the front end portion of which is supported (sandwiched) in between the front end flange 23a of the focusing ring 23 and the inner flange 22a of the retainer ring 22, moves together with the focusing ring 23 and the retainer ring 22 in the optical axis direction, and the front-lens-group support frame 30 that is supported within the front cam ring 20 moves together with the front cam ring 20 in the optical axis direction, so that the front lens group L1 moves in the optical axis direction to thereby change the position of the image plane. During this focusing operation, the inner flange 22a of the retainer ring 22 and the front end flange 23a of the focusing ring 23 integrally rotate relative to the front end portion of the front cam ring 20, and the front cam ring 20 does not rotate. Accordingly, the cam-follower projections 30a which are engaged in the front-lens-group cam through-grooves 20a do not move, so that the front cam ring 20 and the front-lens-group support frame 30 are, in effect, in an integrated state. Namely, during a focusing operation, the front cam ring 20 and the front-lens-group support frame 30 integrally move in the optical axis direction without relatively rotating or relatively moving in the optical axis direction (without changing their mutual relative position) so as to, in effect, function as a single advancing/retracting member. In other words, the front cam ring 20, which carries out a zooming operation, also functions as a advancing/retracting member for carrying out a focusing operation. The shaft of the control screw 27, which protrudes radially inwards through the focusing ring 23 via the screw support seat 23c, moves within the circumferential groove 11g of the fixed frame 11 in accordance with the rotation of the focusing ring 23 during a focusing operation. The circumferential groove 11g is formed as a long circumferential groove that also has a wide width in the optical axis direction in order to prevent the control screw 27 from interfering with the circumferential groove 11g since the control screw 27 rotates with the focusing ring 23 while moving in the optical axis direction. Furthermore, the maximum rotational angle of the focusing ring 23 with respect to the fixed frame 11 is determined by the control screw 27 abutting the circumferential end of the circumferential groove 11g.

Figure 5:
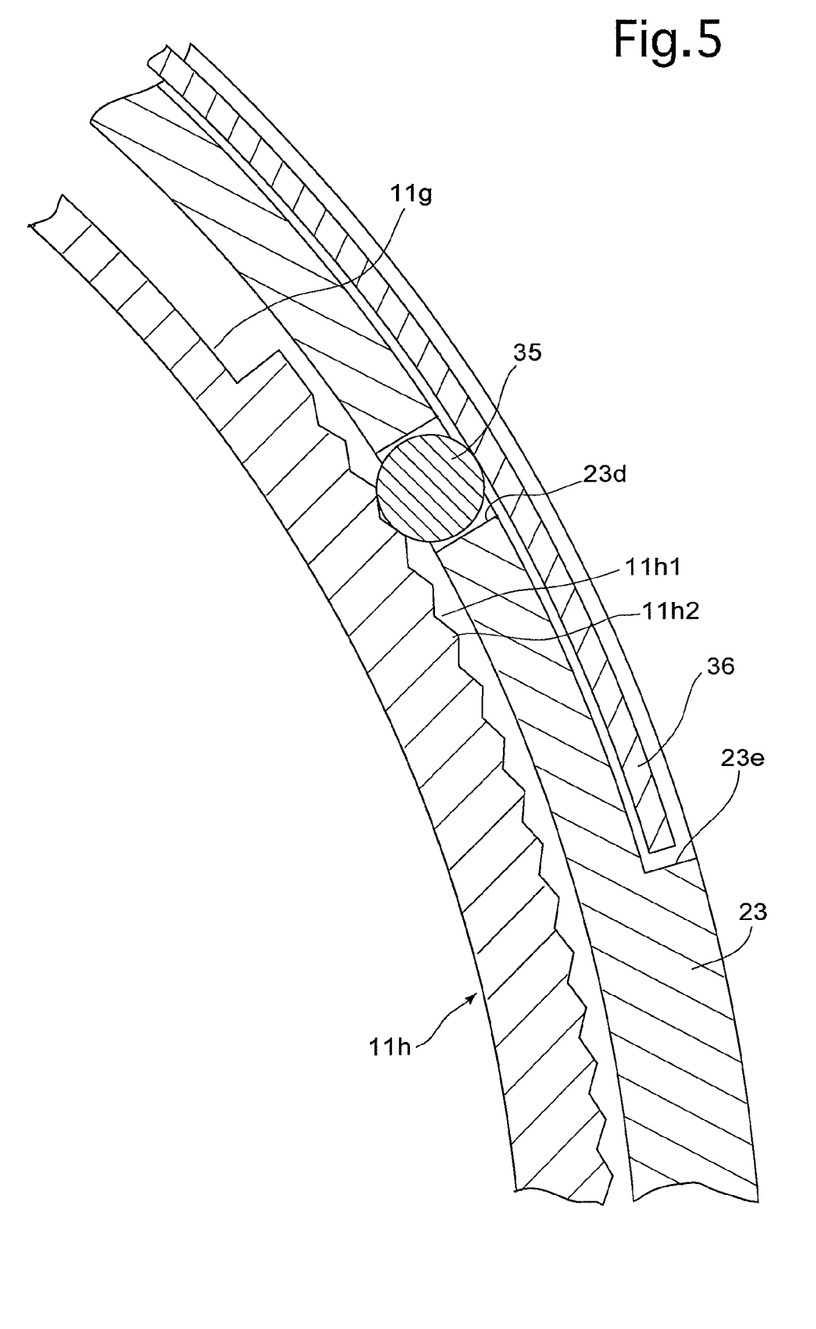
FIG. 5 is an enlarged of part of the cross-sectional view of FIG. 4.

The rotational operation of the focusing ring 23 during the focusing operation is carried out intermittently in a stepwise manner in which the focusing ring 23 is held (click-stopped) via the engagement of the click ball 35 with a click-stop recess 11h1 of the click-stop mechanism provided between the focusing ring 23 and the fixed frame 11. In other words, the movement of the front lens group L1 in the optical axis direction, which occurs as a result of a rotational operation of the focusing ring 23, is not carried out in a stepless manner in accordance with the path of the focusing helicoid 24; rather, the movement of the front lens group L1 in the optical axis direction is controlled in a stepwise manner in accordance with the click-stop positions of the click-stop mechanism while following the path of the focusing helicoid 24. The amount of movement of the front lens group L1 in the optical axis direction per one tactile click (click-stop position) of the click-stop mechanism (when the click ball 35 switches engagement from one click-stop recess 11h1 to a neighboring click-stop recess 11h1) is determined by the angle of rotation of the focusing ring 23 and the inclination angle (lead angle) of the focusing helicoid 24 per one tactile click. The amount of movement of the image plane position that occurs due to the movement of the front lens group L1 when the focusing ring 23 is rotated by one tactile click is determined to be a range within the depth of focus of the lens system (configured of the front lens group L1 and the rear lens group L2). As commonly known in the art, the depth of focus (e) is the tolerance of the placement (position) of the focal plane (image plane), this tolerance defining an imaging range in which the image appears in-focus. The depth of focus (e) can be obtained from the lens specifications; i.e., the F-number (F)

and the required resolving power (c) are used to obtain e=2Fc. Furthermore, by setting an amount of movement M of the front lens group L1 per one tactile click to satisfy the condition e≥sM both at the wide-angle extremity and at the telephoto extremity, wherein s designates the focus sensitivity of the front lens group L1, the amount of movement of the image plane per one tactile click can be set within a range (distance) of the depth of focus both at the wide-angle focal length extremity and at the telephoto focal length extremity. The amount of movement of the image plane per one tactile click being set within the depth of focus means that a click-stop position at which in-focus state is achieved always exists during the stepwise focusing operation using the click-stop mechanism. In other words, the manual focusing mechanism of the present invention ensures a necessary focusing precision while functioning in a stepwise manner. For example, in the optical system (the front lens group L1 and the rear lens group L2) of the lens barrel 10 of the illustrated embodiment, if the depth of focus (e) at the wide-angle extremity and the telephoto extremity is 50 μm and 100 μm, respectively, and the focusing sensitivity (s) of the front lens group L1 at the wide-angle extremity and the telephoto extremity is 0.3 and 1.0, respectively, the unit amount of movement (M) of the front lens group L1 that satisfies the above condition is M≤50 μm/0.3=0.17 mm at the wide-angle extremity, and is M≤100 μm/1.0=0.1 mm at the telephoto extremity. Hence, in this case, the amount of movement of the front lens group L1 in the optical axis direction per one tactile click should be set to an amount that does not exceed the amount of movement M at the telephoto extremity.

Accordingly, in the manual focusing mechanism of the present invention, in which the manual rotational operation of the focusing ring 23 is carried out in a stepwise manner by utilizing click-stop positions, the operability of the focusing operation is improved due to the existence of definite indicia, i.e., in the form of a number of tactile clicks (click-stop positions). An example of an ideal application of the manual focusing mechanism of the present invention is shown in FIG. 2, illustrating a surveillance camera system which is a type that is covered by a cover member 40. The cover member 40 is provided with a transparent portion 41 that covers the front of the photographic optical system of the lens barrel (photographing lens barrel) 10 over an area wider than (i.e., large enough so as not to obstruct object-emanating light rays that are to be incident on the photographic optical system of the lens barrel 10) the area defined by the angle-of-view range (indicated by FA in FIG. 2, wherein the actual angle-of-view range includes the lower half of the cross-sectional view of the lens barrel 10 (photographic optical system) omitted from FIG. 2, i.e., FA×2) of the photographic optical system. Upon a focusing operation being carried out, the amount of adjustment (movement) of the front lens group L1 in the optical axis direction for canceling out a deviation of the in-focus position (focal-length deviation), due to the transparent portion 41 being provided in front the photographic optical system, is converted into a number of operational click-stops of the focusing ring 23. Thereafter, a normal manual focusing operation is carried out before the cover member 40 is attached onto the lens barrel 10, and subsequently a correct (adjusted) in-focus state (focal position) can be easily obtained after the cover member 40 is attached by rotating the focusing ring 23 by the converted number of click-stops. In a type of manual focusing mechanism in which a focusing ring is manually rotated in a stepless manner, it is difficult to adjust the focusing ring by an appropriate amount (in a state where the cover member 40 has not yet been attached) in order to cancel out focal deviation that occurs after the cover member 40 is attached, so that such a focal adjustment operation is largely reliant on the operator's intuition and experience. Whereas, according to the manual focusing mechanism of the present invention, since the amount of rotational adjustment of the focusing ring 23 can be clearly and precisely determined in the form of a number of click-stops, even an unskilled operator can carry out a movement adjustment on the front lens group L1 (via the focusing ring 23) so as to easily and reliably attain an in-focus state under conditions in which the operator cannot visually confirm the actual focal state.

Furthermore, the manual focusing mechanism according to the present invention is not limited to the type of camera system in which optical conditions thereof change upon a cover member such as described above being installed thereafter, this manual focusing mechanism can also be effectively applied to a camera system in which a time lag occurs when displaying an object image. In the case where a focusing operation (i.e., a manual rotational operation of a focusing ring) does not linearly correspond to the focus state of the viewed image due to a delay in the displaying of the object image, it is difficult to discern the necessary (rotational) adjustment amount of the focusing ring in a manual focusing mechanism that carries out a focusing operation in a stepless manner; however, the necessary adjustment amount of the focusing ring can be easily determined if the rotational positions of the focusing ring are set in a stepwise manner.

Note that although the above-described embodiment of the manual focusing mechanism is applied to a zoom lens for use in a CCTV system, the present invention can also be applied to other types of zoom lenses and can be applied to imaging apparatuses other than CCTV systems. Furthermore, the present invention can be applied to a zoom lens system or a varifocal lens system.

Furthermore, in the illustrated embodiment, the focusing ring 23, which constitutes a focusing operational member, is a manually rotatable ring that is rotated around the outer peripheral surface of the fixed frame 11; however, the present invention is not limited to such a manually rotatable ring, the present invention can be applied to a focusing operational member which is linearly movable (slidable) in the optical axis direction. In other words, the focusing operational member of the present invention only needs to be movable in a predetermined direction while providing a plurality of click-stop positions with respect to at least a supporting member.

Furthermore, in the illustrated embodiment, the lens barrel 10 is structured such that the drive member used for zooming is divided into the front cam ring 20 and the rear cam ring 21, and such that the front cam ring 20 and the focusing ring 23 move together with the front-lens-group support frame 30 in the optical axis direction during an focusing operation; however, it is possible to apply the present invention to a manual focusing mechanism having an orthodox structure in which only a member corresponding to the front-lens-group support frame 30 is moved in the optical axis direction in accordance with a rotational operation of the focusing ring 23 without moving the focusing ring 23 and the front cam ring 20 in the optical axis direction. Specifically, in this orthodox structure, the front cam ring 20 and the rear cam ring 21 are integrally formed, and it is possible to provide an advancing/retracting driving device that corresponds to the focusing helicoid 24 in between the focusing ring 23 and the front-lens-group support frame 30.

Furthermore, in the illustrated embodiment, the focusing helicoid 24 is used as an advancing/retracting driving device, and is advantageous in regard to supporting strength and operational precision; however, it is possible to employ an alternative structure other than a helicoid in the advancing/retracting driving device of the focusing lens group (front lens group L1) so long as the alternative structure applies an advancing/retracting driving force in the optical axis direction via a manual rotational operation.

Furthermore, the detailed structure of the click-stop mechanism is not limited to the illustrated embodiment of the present invention. For example, in the illustrated embodiment, the click ball 35, which constitutes a stopper member, is provided in the focusing ring 23, and the click-stop ring section 11h (which has a toothed surface) that supports the click ball 35 is formed in the large-diameter cylindrical portion 11a of the fixed frame 11; however, a reversed arrangement is possible in which the stopper member (click ball 35) is provided in the large-diameter cylindrical portion 11a and the toothed surface is provided on the focusing ring 23. The assembly efficiency of the lens barrel 10 is enhanced if the stopper member (click ball 35) is arranged on the outer side (on the focusing ring 23), as in the illustrated embodiment. Whereas, the manual focusing mechanism can be downsized (miniaturized) in the case where the stopper member (click ball 35) is provided on the inner side (on the fixed frame 11).

Furthermore, from the viewpoint of smoothness of operation of the click-stop mechanism and the simplicity of structure, it is desirable for a structure to be employed that engages/disengages the click ball 35 (spherical ball) with/from the toothed click-stop ring section 11h (the click-stop recesses 11h1 and the click-stop projections 11h2) as described in the illustrated embodiment; however, a different structure of a click-stop mechanism having engaging portions may be alternatively employed. For example, instead of using a spherical ball like the click ball 35, it is possible for stopper-members to be used which have a cylindrical or tapered/conical shape.

Furthermore, in the illustrated embodiment of the click-stop mechanism, the click spring 36, which is an semi-annular-shaped (C-shaped) leaf spring, is used as a biaser; however, the biaser is not limited to such a structure. For example, it is possible to close over the outer periphery of the ball-receiving hole 23d and insert a compression spring in between the outer peripheral side of the ball-receiving hole 23d and the click ball 35. Moreover, it is possible to use a cap-shaped stopper member, instead of the spherical shaped click ball 35, having a recess for accommodating a compression spring therein.

In an alternative embodiment of the click-stop mechanism of the present invention, it is possible to integrally form a stopper member corresponding to the click ball 35 to a biaser itself that corresponds to the click spring 36.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
   a multi-focal lens system that includes a multi-focal lens group continuously movable between a wide-angle focal length extremity and a telephoto focal length extremity; and
   a manual focusing lens system that includes a focusing lens group, which changes an image plane position by linearly moving said focusing lens group in an optical axis direction thereof via a manual operation of a focusing operational member, said manual focusing lens system comprising:
   a click-stop mechanism which holds said focusing operational member at one of a plurality of click-stop positions with respect to a support member, which supports said focusing operational member, while maintaining an operating status of an operating member of the multi-focal lens group and while providing for the movement of the focusing lens group in the optical axis direction,
   wherein an amount of movement of said image plane position in the optical axis direction per one click-stop position of the focusing operational member via said click-stop mechanism is determined to be within a range of the depth of focus of said lens system of said imaging apparatus.

2. The imaging apparatus according to claim 1, wherein said click-stop mechanism comprises:
   a toothed section provided on one of the focusing operational member and the support member, said toothed section provided with a plurality of click-stop recesses and a plurality of click-stop projections that are alternately arranged at different positions in an operational direction of said focusing operational member; and
   a stopper member provided on the other of the focusing operational member and the support member, said stopper member being movable in an engaging/disengaging direction toward/from said toothed section, wherein said stopper member applies a movement resistance against said focusing operational member by engagement of said stopper member with any one of said plurality of click-stop recesses of said toothed section.

3. The imaging apparatus according to claim 2, wherein said stopper member comprises a spherical ball.

4. The imaging apparatus according to claim 2, wherein said click-stop mechanism further comprises a biaser for biasing said stopper member in the engaging direction toward said toothed section so that said stopper member engages with any one of said plurality of click-stop recesses of said toothed section.

5. The imaging apparatus according to claim 4, wherein said focusing operational member and said support member comprise a pair of ring members that are coaxially arranged about the optical axis of said lens system, wherein inner and outer peripheral surfaces of said pair of ring members mutually face each other, and
   wherein said biaser includes a semi-annular leaf spring which is supported along a peripheral surface of one of said pair of ring members.

6. The imaging apparatus according to claim 5, wherein said semi-annular leaf spring is provided along said peripheral surface of said one ring member so as to occupy an angular range of 190 degrees through 220 degrees in a circumferential direction of said one ring member.

7. The imaging apparatus according to claim 5, wherein said focusing operational member moves in the optical axis direction while rotating about the optical axis with respect to said support member via a helicoid formed on said inner and outer peripheral surfaces of said pair of ring members that constitute said focusing operational member and said support member, wherein said focusing lens group moves together with said focusing operational member in the optical axis direction.

8. The imaging apparatus according to claim 1, wherein said focusing lens group satisfies condition (1) at said wide-angle focal length extremity and said telephoto focal length extremity, respectively:

$$e > sM \qquad (1)$$

wherein:

e designates the depth of focus of said multi-focal lens system;

s designates the focus sensitivity of said focusing lens group; and

M designates an amount of movement of said focusing lens group per one tactile click of said focusing operational member.

9. An imaging apparatus comprising:

a photographing lens barrel provided with a photographing lens system and a focusing mechanism; and a transparent cover, which is provided separately from said photographing lens system and covers at least an area defined by an angle-of-view of said photographing lens system, wherein said focusing mechanism includes a focusing operational member that is provided with a click-stop mechanism, said click-stop mechanism enabling said focusing operation member to be manually operable while providing a plurality of click-stop positions at which said focusing operation member is held, while maintaining an operating status of an operating member of the photographing lens system and while providing for the movement of the focusing operational member in the optical axis direction, and wherein an amount of movement of an image plane position in the optical axis direction per one of said click-stop positions of said focusing operational member via said click-stop mechanism is determined to be within a range of the depth of focus of said photographing lens system.

* * * * *